United States Patent
Blake et al.

(10) Patent No.: US 7,283,656 B2
(45) Date of Patent: Oct. 16, 2007

(54) ASSESSING ELECTRONIC IMAGE QUALITY

(75) Inventors: James A. Blake, Brunswick, OH (US); Pablo Gonzalez, Forney, TX (US); Randall Lee Mueller, Kansas City, MO (US); V. Srinivas Nori, Norcross, GA (US); Steven Q. Purser, Plano, TX (US); Thomas Edwin Schaadt, Westerville, OH (US)

(73) Assignees: Federal Reserve Bank of Cleveland, Cleveland, OH (US); Federal Reserve Bank of Kansas City, Kansas City, MO (US); Federal Reserve Bank of Atlanta, Atlanta, GA (US); Federal Reserve Bank of Dallas, Dallas, TX (US)

( * ) Notice: Subject to any disclaimer, the term of this patent is extended or adjusted under 35 U.S.C. 154(b) by 102 days.

(21) Appl. No.: 11/079,120

(22) Filed: Mar. 14, 2005

(65) Prior Publication Data
US 2005/0213805 A1 Sep. 29, 2005

Related U.S. Application Data

(60) Provisional application No. 60/553,816, filed on Mar. 17, 2004.

(51) Int. Cl.
*G06K 9/00* (2006.01)
(52) U.S. Cl. ...................... 382/137; 382/112
(58) Field of Classification Search ........... 382/112, 382/100, 134–140, 162–167, 298, 270, 305, 382/309, 254, 323, 289, 239; 358/1.1–1.15, 358/3.27; 250/559.01; 715/700, 500, 738; 707/1–7, 102; 705/35–45, 75, 64; 400/578; 235/379; 702/36, 57, 81; 348/180–193
See application file for complete search history.

(56) References Cited

U.S. PATENT DOCUMENTS

| | | | |
|---|---|---|---|
| 5,120,944 A | 6/1992 | Kern et al. | 382/140 |
| 5,187,750 A | 2/1993 | Behera | 235/379 |
| 5,600,732 A * | 2/1997 | Ott et al. | 382/112 |
| 5,687,250 A | 11/1997 | Curley et al. | 382/112 |
| 5,692,065 A | 11/1997 | Prakash et al. | 382/112 |
| 5,754,674 A | 5/1998 | Ott et al. | 382/112 |
| 5,790,717 A | 8/1998 | Judd | 382/323 |
| 5,819,236 A | 10/1998 | Josephson | 705/35 |
| 5,832,140 A | 11/1998 | Stapleton et al. | 382/298 |
| 5,937,084 A | 8/1999 | Crabtree et al. | 382/137 |
| 5,940,524 A | 8/1999 | Murayama et al. | 382/112 |

(Continued)

OTHER PUBLICATIONS

"What is Check 21?", VSOFT Corporation, available at http://www.vsoftcorp.com/check21.htm, 2006.

(Continued)

*Primary Examiner*—Ishrat Sherali
(74) *Attorney, Agent, or Firm*—King & Spalding

(57) ABSTRACT

Assessing the quality of an electronic image comprises determining a quality rating for the electronic image, associating image quality thresholds with purposes for electronic images, selecting the purpose that corresponds to the electronic image, identifying an image quality threshold associated with the selected purpose, and determining whether the quality rating meets the image quality threshold. The electronic image is suitable for its intended purpose if its quality rating meets the threshold.

43 Claims, 3 Drawing Sheets

U.S. PATENT DOCUMENTS

| | | | |
|---|---|---|---|
| 5,963,654 A | 10/1999 | Prakash et al. | 382/112 |
| 6,019,282 A | 2/2000 | Thompson et al. | 235/379 |
| 6,097,834 A | 8/2000 | Krouse et al. | 382/137 |
| 6,115,509 A | 9/2000 | Yeskel | 382/309 |
| 6,236,756 B1 | 5/2001 | Kimura et al. | 382/239 |
| 6,351,546 B1 | 2/2002 | Murayama et al. | 382/112 |
| 6,351,553 B1 | 2/2002 | Hayosh | 382/139 |
| 6,571,000 B1 | 5/2003 | Rasmussen et al. | 382/112 |
| 6,577,761 B1 | 6/2003 | Kanno et al. | 382/167 |
| 6,585,775 B1 | 7/2003 | Cosentino et al. | 715/500 |
| 6,658,139 B1 | 12/2003 | Cookingham et al. | 382/112 |
| 6,717,592 B2 | 4/2004 | Gusler et al. | 715/738 |
| 6,792,133 B2 | 9/2004 | Ott et al. | 382/112 |
| 6,850,950 B1 | 2/2005 | Clarke et al. | 707/102 |
| 6,912,297 B2 | 6/2005 | Scott et al. | 382/112 |
| 6,996,263 B2 | 2/2006 | Jones et al. | 382/135 |
| 7,000,828 B2 | 2/2006 | Jones | 235/379 |
| 7,066,668 B2 | 6/2006 | Sandison et al. | 400/578 |
| 7,066,669 B2 | 6/2006 | Lugg | 400/578 |
| 7,082,216 B2 | 7/2006 | Jones et al. | 382/112 |
| 7,092,560 B2 | 8/2006 | Jones et al. | 382/135 |
| 7,099,845 B2 | 8/2006 | Higgins et al. | 705/45 |
| 7,167,580 B2 * | 1/2007 | Klein et al. | 382/112 |
| 2002/0150279 A1 | 10/2002 | Scott et al. | 382/112 |
| 2003/0158811 A1 | 8/2003 | Sanders et al. | 705/39 |
| 2003/0202690 A1 | 10/2003 | Jones et al. | 382/139 |
| 2003/0225704 A1 | 12/2003 | Park et al. | 705/64 |
| 2004/0030621 A1 | 2/2004 | Cobb | 705/42 |
| 2004/0109596 A1 | 6/2004 | Doran | 382/137 |
| 2004/0133516 A1 | 7/2004 | Buchanan et al. | 705/42 |
| 2004/0143621 A1 | 7/2004 | Fredrickson et al. | 709/200 |
| 2004/0236688 A1 | 11/2004 | Bozeman | 705/42 |
| 2005/0018896 A1 | 1/2005 | Heit et al. | 382/137 |
| 2005/0071283 A1 | 3/2005 | Randle et al. | 705/75 |
| 2005/0080719 A1 | 4/2005 | Sellen et al. | 705/38 |
| 2005/0080738 A1 | 4/2005 | Sellen et al. | 705/42 |
| 2005/0097046 A1 | 5/2005 | Singfield | 235/379 |
| 2005/0097050 A1 | 5/2005 | Orcutt | 705/45 |
| 2005/0109833 A1 | 5/2005 | Page | 705/42 |
| 2005/0129300 A1 | 6/2005 | Sandison et al. | 235/379 |
| 2005/0144131 A1 | 6/2005 | Aziz | 235/379 |
| 2005/0171899 A1 | 8/2005 | Dunn et al. | 705/39 |
| 2005/0175221 A1 | 8/2005 | Scott et al. | 382/112 |
| 2005/0211763 A1 | 9/2005 | Sgambati et al. | 705/42 |
| 2005/0213805 A1 | 9/2005 | Blake et al. | 382/137 |
| 2005/0220324 A1 * | 10/2005 | Klein et al. | 382/112 |
| 2005/0238252 A1 | 10/2005 | Prakash et al. | 382/289 |
| 2005/0243378 A1 | 11/2005 | Klein et al. | 358/3.27 |
| 2005/0243379 A1 | 11/2005 | Klein et al. | 358/3.27 |
| 2005/0244035 A1 | 11/2005 | Klein et al. | 382/112 |
| 2005/0252960 A1 | 11/2005 | Murata | 235/379 |
| 2005/0256839 A1 | 11/2005 | Leong et al. | 707/1 |
| 2005/0281448 A1 | 12/2005 | Lugg | 382/139 |
| 2006/0006222 A1 | 1/2006 | Brey et al. | 235/399 |
| 2006/0023930 A1 | 2/2006 | Patel et al. | 382/137 |
| 2006/0045321 A1 | 3/2006 | Yu | 382/137 |
| 2006/0045600 A1 | 3/2006 | Lugg | 400/578 |
| 2006/0080245 A1 | 4/2006 | Bahl et al. | 705/40 |
| 2006/0106717 A1 | 5/2006 | Randle et al. | 705/45 |
| 2006/0112013 A1 | 5/2006 | Maloney | 705/45 |
| 2006/0118613 A1 | 6/2006 | McMann et al. | 235/379 |
| 2006/0182331 A1 | 8/2006 | Gilson et al. | 382/137 |
| 2006/0182332 A1 | 8/2006 | Weber | 382/139 |
| 2006/0184441 A1 | 8/2006 | Haschka et al. | 705/35 |
| 2006/0186194 A1 | 8/2006 | Richardson et al. | 235/379 |
| 2006/0188310 A1 | 8/2006 | Sandison et al. | 400/578 |
| 2006/0188311 A1 | 8/2006 | Lugg | 400/578 |

OTHER PUBLICATIONS

"Check21 Cash Letter: Clear Check Images Rather than Paper Checks", SYMITAR, available at http://www.symitar.com/Default.aspx?P=2dl883d0-91be-496d-9047-64a83378dd36, 2006.

"Creating, Editing and Using Image Cash Letter, X9.37 Files", All My Papers, available at http://www.ggx.com/solutions_7.htm, 2006.

"Vision, Strategy & Approach to Image Quality & Archive Integrity, A Review fo Carreker's Current Initiatives Towards Image Quality Detection & Resolution", Federal Reserve System, Aug. 19, 2003, Copyright © 2003 Carreker Corporation, pp. 1-43.

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Systems, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Divison of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

* cited by examiner

ASSESSING ELECTRONIC IMAGE QUALITY

RELATED PATENT APPLICATION

This application claims priority under 35 U.S.C. § 119 to U.S. Provisional Patent Application No. 60/553,816 filed Mar. 17, 2004 and entitled "System and Method for Electronic Image Quality Analysis." The subject matter of the above-identified priority application is hereby fully incorporated herein by reference.

FIELD OF THE INVENTION

The present invention relates to analyzing the quality of electronic images. More particularly, the present invention relates to determining whether the electronic images are of suitable quality for their intended purpose.

BACKGROUND OF THE INVENTION

Many document processing operations exist that require an image of each document for data processing, archival, or other purposes. For example, in processing bank checks through the commercial banking system, it is desirable to digitally record images of bank checks for data processing and archival purposes. Additionally, it also is desirable to verify the quality of a captured image before the check leaves the possession of the image recording entity. In this way, documents which were not properly imaged may be re-recorded before being destroyed or otherwise taken out of possession of the entity requiring the image.

Electronic check images serve many purposes in check processing. For example, paper checks can be truncated early in the check clearing process if replaced by a suitable electronic check image. Then, the check can be cleared based in the electronic image rather than the paper document. Truncating the paper checks early in the process reduces transportation costs related to moving paper checks among the various banks and other check processors who participate in the process. Check images also can be archived electronically in place of paper checks for later retrieval, if needed.

A relatively new use for electronic check images is to produce a substitute paper check from electronic images of the original paper check. Under the Check Clearing for the 21st Century Act (the "Act"), a paper substitute check meeting specified requirements is the legal equivalent of an original paper check and includes all the information contained on the original check, and a receiving institution is required to accept the substitute check for payment. The Act facilitates check truncation by creating a new negotiable instrument called the substitute check, which permits banks to truncate original checks, to process check information electronically, and to deliver substitute checks to banks that want to continue receiving paper checks.

By agreement, banks also can accept electronic check images as proper presentment for payment. In that case, the check processor can accept image cash letter deposits and can create image cash letter presentment files from items deposited both electronically and physically for forward collection and return.

For an electronic image to be used for any of the previously discussed purposes, the check image must be of sufficient quality to provide the necessary information for each purpose. For example, a substitute check must meet the requirements of the Accredited Standards Committee ("ANS") X9.100 to be considered the legal equivalent of a paper check. Accordingly, check images used to produce a substitute check must be of sufficient quality to produce a paper document meeting that standard. Additionally, check images used for electronic check processing must meet the standards set forth in ANS X9.37 regarding the electronic exchange of check and image data.

Conventional methods exist for assessing the quality of a captured electronic image. According to one conventional method, an image quality analysis ("IQA") engine can analyze the quality of captured electronic images. The IQA engine 116 can produce a rating that indicates the quality of the electronic images. For example, the IQA may rate each electronic image on a quality scale of Blank or M or P or E or U or a range of 0 to 9. A Blank can indicate an image was present without a 54 record and the IQA engine analysis was not performed. An M indicates that an image was not provided to the IQA engine 116. A P indicates that an image was present with a 54 record reflecting a usable, acceptable quality image and the IQA engine analysis was not performed. An E indicates that an image was present with either a 54 record reflecting a usable, acceptable quality image or the 54 record was not available, and the IQA engine analysis failed. A U indicates that there was an image present with a 54 record reflecting either an unusable or unacceptable image. A rating of "9" can indicate a high-quality image, while a rating of "0" can indicate a very low quality image.

The image quality rating for each image can be compared to an accept/reject image quality threshold to determine whether the respective images are acceptable. Images having an image quality rating the meets the threshold are accepted, and images having an image quality rating below the threshold are rejected.

Conventional image quality analysis methods have several deficiencies. For example, all images are treated the same. The images are either accepted or rejected based on the same threshold value. Even if an image could be of low quality for its intended purpose, it is rejected based on the quality threshold set for all images. Thus, the conventional methods do not analyze image quality using different image quality thresholds based on the destination, intended use, or other characteristic of the image.

Accordingly, a need exists in the art for a system and method for assessing image quality of electronic images based on the destination, intended use, characteristic, or other purpose of the images. Additionally, a need exists for further analyzing rejected images to determine whether those images are suitable for their intended use.

SUMMARY OF THE INVENTION

The present invention comprises a system and method for assessing the quality of electronic images. Electronic images can be captured from a variety of sources, including paper documents, such as checks or other financial documents. The quality level required to accept an electronic image can be based on a purpose of the electronic image. Accordingly, different purposes can require different levels of quality for accepting an image. A quality rating of an electronic image is compared to a quality threshold required for the purpose of the electronic image. The electronic image is suitable for its intended purpose if its quality level meets the quality threshold.

According to one aspect, image quality thresholds can be associated with multiple purposes for electronic images. To assess the quality of a particular electronic image, a quality rating indicating a quality of the electronic image is generated, the purpose of the image is identified, the image quality threshold associated with the purpose is identified, and the quality rating is compared to the image quality threshold. The electronic image is suitable for its intended purpose if the quality rating meets the image quality threshold. The quality rating can comprise an image quality value produced by an image quality analysis engine, an image confidence score produced by an image usability analysis engine, or a composite score based on an image quality value and an image confidence score.

Another aspect relates to a method for assessing the quality of an electronic image of a document. An image quality value is assigned to an electronic image, a selected purpose for the electronic image is identified, and an image quality threshold based on the selected purpose is identified. Then, the image quality value is compared to the image quality threshold to determine whether the image is suitable for its intended purpose.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
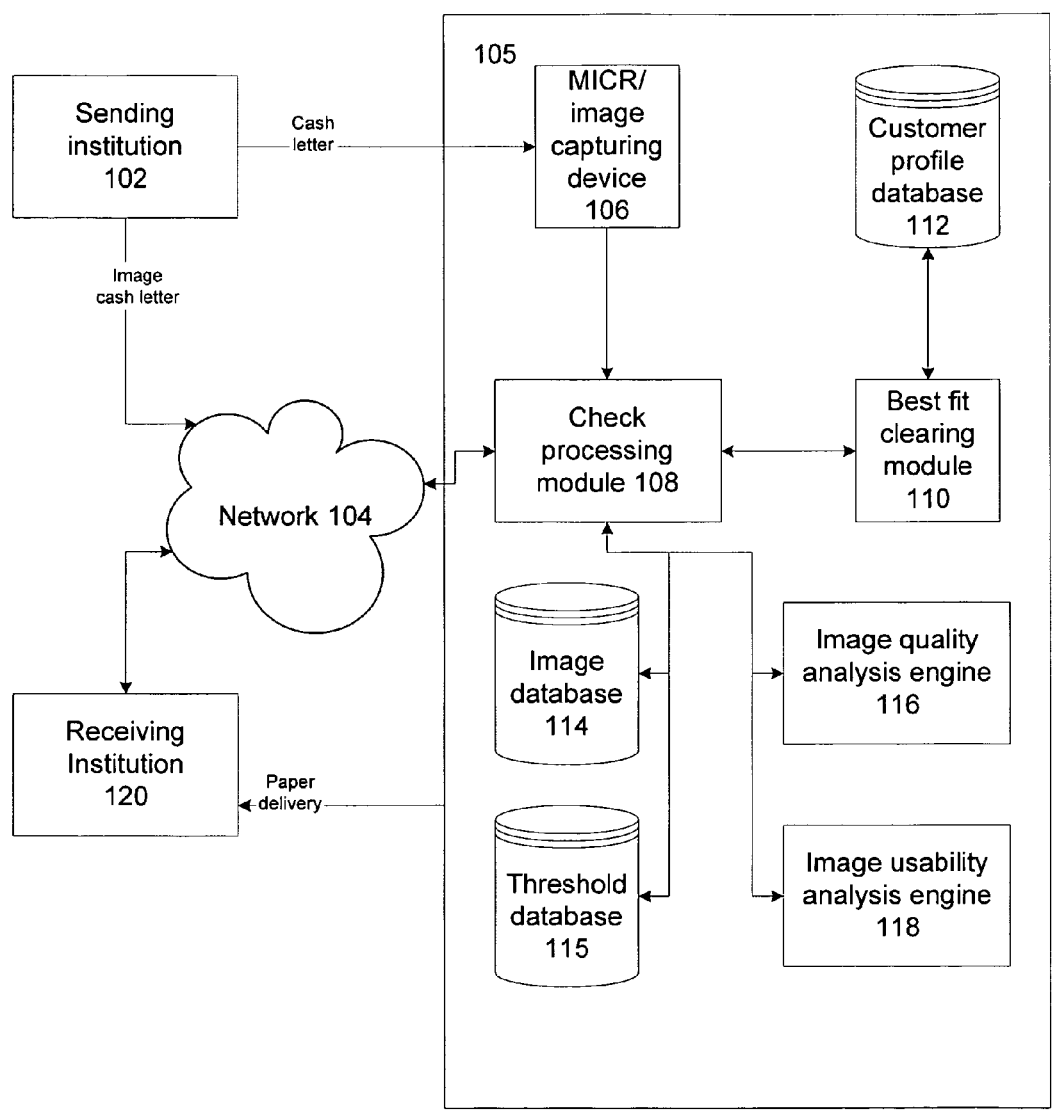
FIG. 1 is a block diagram illustrating a system for assessing electronic image quality according to an exemplary embodiment of the present invention.

The present invention can assess the quality of electronic images captured from a variety of sources, including paper documents, such as checks or other financial documents. The quality level required to accept an electronic image can be based on a purpose of the electronic image. The purpose can comprise a destination, intended use, or other purpose of the electronic image. According to an exemplary embodiment, image quality thresholds can be associated with multiple purposes for electronic images. To assess the quality of a particular electronic image, a quality rating indicating a quality of the electronic image is generated, the purpose of the image is identified, the image quality threshold associated with the purpose is identified, and the quality rating is compared to the image quality threshold. The electronic image is acceptable if the quality rating meets the image quality threshold. In exemplary embodiments, the quality rating can comprise an image quality value produced by an image quality analysis engine, an image confidence score produced by an image usability analysis engine, or a composite score based on an image quality value and an image confidence score.

The present invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Referring to the drawings, in which like numerals represent like elements, aspects of the exemplary embodiments will be described.

FIG. 1 is a block diagram illustrating a system for assessing electronic image quality according to an exemplary embodiment of the present invention. As shown in FIG. 1, a sending institution 102 can send an image cash letter to a check processor 105 via a distributed computer network 104. In an exemplary embodiment, the check processor 105 can comprise a Federal Reserve Bank or other check processor. An image cash letter comprises electronic MICR data from each check and electronic images of the front and/or back sides of each check. If the sending institution 102 provides an image cash letter, the electronic images and associated financial data are forwarded to a check processing module 108 at the check processor 105. In exemplary embodiments, the network 104 can comprise the Internet, a dedicated communication line, shared network switch or other suitable network.

Alternatively, the sending institution 102 can send a cash letter to the check processor 105. A cash letter comprises paper checks. In that case, the check processor 105 electronically captures the MICR data from each check and images of the front and/or back sides of each check. The check processor 105 can capture that data via a MICR/image capturing device 106, which can comprise a separate or integrated MICR reader and image capturing device. Then, the MICR/image capturing device 106 forwards the electronic data and images to the check processing module 108.

The check processing module 108 receives the electronic MICR data and images from the image cash letter or from the MICR/image capturing device 106 and stores the electronic images in an image archive 114. The check processing module 108 communicates the MICR data to a best fit clearing module 110, which determines the best method for clearing and settling the checks and sorts the check data based on that determination. From the MICR data, the best fit clearing module 110 identifies the receiving institution 120 that is the payor for respective checks in the cash letter or image cash letter received from the sending institution 102. Then, the best fit clearing module 110 reads the receiving institution's 120 profile from a customer profile database 112. The customer profile indicates the receiving institution's 120 preferences for receiving information regarding checks presented for payment.

According to an exemplary embodiment, the best fit clearing module 110 can make the determinations ("arguments") discussed below to sort the electronic check data. The best fit clearing module 110 selects a first check having electronic data (either financial data alone or financial and image data) at the check processing module 108 and sorts the first check based on use of some or all of the following arguments:

1. If a MICR codeline of the electronic check data includes an error, then the best fit clearing module 110 can reject the electronic check data. In this case, the best fit clearing module 110 sorts the electronic check data to an internal location for repair by an operator. Examples of MICR codeline errors include incomplete or missing MICR data, such as the routing number, account number, or check number. In an exemplary embodiment, rejected items can be coded with an "R" for routing to the proper location for correction. To detect a MICR codeline error, the best fit clearing module 110 compares the electronic MICR information to required fields and identifies missing or improperly formatted data.

2. If the electronic check data includes an image error, then the best fit clearing module 110 can specially reject the electronic check data. Specially rejected items can be coded with an "SR" for routing to the proper location for correction or replacement. In this case, if the sending institution 102 provided an image cash letter, then the best fit clearing module 110 sorts the electronic check data for return to the sending institution 102 to provide a satisfactory electronic check image. If the sending institution 102 provided a cash letter, then the best fit clearing module 110 sorts the electronic check data for return to an operator of the check processor 105 to provide a satisfactory electronic check image. To determine if an image includes an error, the check processing module 108 can assess the quality of the image. Exemplary embodiments of assessing image quality are discussed in more detail below.

3. If the check is drawn on a receiving institution 120 having an agreement with the check processor 105 to accept image cash letters, then the best fit clearing module 110 sorts the electronic data as an "image electronic cash letter" and codes the check data with an "I/E." Then, the check processor 105 creates an image cash letter for the receiving institution 120. The best fit clearing module 110 can determine if the receiving institution 120 accepts image cash letters by reading the receiving institution's 120 preset preference associated with its routing number in the customer profile database 112.

4. If the check is drawn on a receiving institution 120 that subscribes to a long-term image archive service provided by the check processor 105, then the best fit clearing module 110 sorts the electronic data for the "image archive" and codes the check data with an "I/A." Then, the check processor 105 forwards the electronic check images with associated financial data to a long-term image archive (not shown). Additionally, the check processor 105 presents the electronic financial data to the receiving institution 120 in an electronic cash letter file without images. The best fit clearing module 110 can determine if the receiving institution 120 subscribes to the image archive service by reading the receiving institution's 120 preset preference associated with its routing number in the customer profile database 112.

5. If the check is drawn on a receiving institution 120 that requires the check processor 105 to present a paper check, then the best fit clearing module 110 sorts the electronic data as requiring an image replacement document, i.e., a substitute check, and codes the check data with an "IRD." Then, the check processor 105 creates a cash letter comprising the substitute check, or alternatively comprising the original paper check if deposited locally with the check processor 105. The best fit clearing module 110 can determine if the receiving institution 120 requires a paper check by reading the receiving institution's 120 preset preference associated with its routing number in the customer profile database 112.

6. If the check is drawn on a receiving institution 120 that does not want to receive paper checks or check images, then the best fit clearing module 110 sorts the electronic data for treatment as an electronic cash letter and codes the check data with an "ECL." Then, the check processor 105 creates an electronic cash letter comprising the electronic financial data and presents the letter to the receiving institution 120. The best fit clearing module 110 can determine if the receiving institution 120 desires an ECL by reading the receiving institution's 120 preset preference associated with its routing number in the customer profile database 112.

7. If the check is drawn on a receiving institution 120 for which a different branch of the check processor 105 is the presenting bank, then the best fit clearing module 110 sorts the electronic data for presentment by a different branch and codes the check data with an identifier of the presenting branch. Then, the best fit clearing module 110 transfers the electronic data to the check processing module of the appropriate presenting branch. The best fit clearing module 110 can determine the presenting branch by reading the receiving institution's 120 preset preference associated with its routing number in the customer profile database 112.

8. For an exemplary operating environment, if the check is drawn on a receiving institution 120 that receives checks presented from any branch regardless of where the receiving institution 120 is located, then the best fit clearing module 110 codes the check data with an "Natl." Thereafter, the check processor 105 prepares the proper presentment form and presents the check to the receiving institution 120. The best fit clearing module 110 can determine if the receiving institution 120 accepts checks presented by any branch by reading the receiving institution's 120 preset preference associated with its routing number in the customer profile database 112.

After sorting the selected check, the best fit clearing module 110 repeats the sort process for the remaining checks.

Exemplary embodiments of assessing image quality will now be described. The check processing module 108 can determine whether the electronic check images are suitable for further processing. The check processing module 108 stores multiple purposes for check images in a threshold database 115. In an exemplary embodiment, the purposes can comprise the destination or intended use of an image. For example, the purposes can comprise the uses discussed previously with respect to the best fit clearing module 110. In that case, the purposes can comprise image electronic cash letter, long-term image archive, substitute check, and electronic cash letter. The purposes can comprise any suitable destination or use of an electronic image.

The check processing module 108 also can store multiple image quality thresholds in the threshold database 115. The image quality thresholds are associated with respective purposes, thereby indicating different image quality levels required for different purposes. Alternatively, if only a single threshold is used, then the same quality level is required for each purpose.

Then, the check processing module 108 determines whether an image quality rating for a particular electronic image meets the image quality threshold established for the purpose of the particular electronic image to determine whether to accept or reject the particular electronic image (i.e., to determine how to sort the particular electronic image). The check processing module 108 compares the image quality rating for each electronic image with the image quality threshold associated with the respective image's purpose to determine if the electronic image is suitable for its intended purpose. Accordingly, the check processing module 108 can accept or reject images based on different image quality thresholds that each correspond to a destination, use, business case; or other established purpose of the individual images. Then, the best fit clearing module 110 can sort the electronic images based on the different image quality thresholds and can place the electronic images in the proper queue for further processing.

Thus, the check processing module 108 can accept or reject electronic images based on the quality rating and the destination, use, or other purpose of the electronic image. For example, an electronic image received from a sending institution 102 that will be used to produce a substitute check may require a higher quality rating than an image created by the check processor 105 that will be used to produce a substitute check. That difference results from the processor's ability to keep the original check for future reference after it captures the electronic image of the check. Additionally, a very low quality image (or even no image) may suffice for a receiving institution 120 that requires only electronic financial data without an image (an electronic cash letter). Accordingly, in an exemplary embodiment, the check processing module 108 or best fit clearing module 110 can require a quality rating of "9" for electronic images received from a sending institution 102 for which the check processor 105 will produce a substitute check, a quality rating of "7" for electronic images received from the MICR/image capturing device 106 for which the check processor 105 will produce a substitute check, and a quality rating of "0" or no rating for electronic images corresponding to checks that will be processed via an electronic cash letter (without images).

Exemplary embodiments for generating the image quality rating will now be described. The image quality rating indicates the quality of each respective electronic image. The image quality rating can be generated by any suitable means for detecting the quality or usability of an image. According to exemplary embodiments, the quality rating can comprise an image quality value produced by an image quality analysis ("IQA") engine 116, an image confidence score produced by an image usability analysis engine 118, or a composite score based on an image quality value and an image confidence score.

In an exemplary embodiment, the IQA engine 116 analyzes the quality of each image. The IQA engine 116 can produce an image quality value that indicates the quality of the electronic image. For example, the IQA engine 116 can rate each electronic image on a quality scale, such as a scale comprising the ratings of 0 to 9 or Blank or M or U or E or P. A rating having a value of "9" can indicate a high-quality image, while a rating having a value of "0" can indicate very low quality image. Any suitable metric of image quality can be used to develop the image quality rating. For example, the IQA engine 116 can detect streaks on the image, skew of the image, orientation of the image, pixel count, image data size, or any other suitable quality factor and can determine a result corresponding to an amount of each factor present in the electronic image.

The IQA engine 116 can compare the determined result for each metric with a translation table to obtain the image quality value for the analyzed electronic image. In an exemplary embodiment, the translation table can comprise results correlated with image quality values, and the IQA engine 116 can determine the image quality rating based on the corresponding image quality values in the translation table.

According to an exemplary embodiment, the IQA engine 116 can produce a value for each metric analyzed by the IQA engine 116. Then, the image quality value can be based on the lowest value for all of the metrics. Alternatively, the image quality value can comprise a composite value based on the values for two or more of the metrics. In another exemplary embodiment, the IQA engine can produce high, low, and median values for each metric, and the image quality value can be based on one or more of those values.

Then, the check processing module 108 reads an image quality threshold associated with the intended purpose of an image from the threshold database 115. The intended purpose of the image can be based on the receiving institution's 120 preferred delivery method. The check processing module 108 then compares the image quality threshold to the image quality value produced by the IQA engine 116. If the image quality value meets or exceeds the image quality threshold, then the check processing module 108 prepares the proper delivery method for forwarding to the receiving institution 120. If the image quality value does not meet the image quality threshold, then the image can be sent or routed back to the sending institution 102 or an operator of the check processor 105 for correction, depending on the entity that created the electronic image.

In an alternative exemplary embodiment, the rejected image can be forwarded to an image usability analysis engine 118. The image usability analysis engine 118 can further assess the quality of the image. The image usability analysis engine 118 can develop an image confidence score indicating a usability rating for the image. Then, the check processing module 108 can compare the image confidence score to the image quality threshold to determine whether the image is suitable for its intended use. If not, then the check can be routed back to the sending institution 102 or an operator of the check processor 105 for correction, depending on the entity that created the electronic image. If the confidence score meets or exceeds the image quality threshold, then the check processing module 108 can prepare the proper form of delivery for the check to the receiving institution 120 based on the receiving institution's 120 preferences.

In another alternative exemplary embodiment, the image confidence score can be combined with the image quality value to create a composite score that indicates the quality and usability of the image. In that case, the check processing module 108 can compare the composite score to the image quality threshold to determine whether the image is acceptable for further processing. If not, then the check can be routed back to the sending institution 102 or an operator of the check processor 105 for correction, depending on the entity that created the electronic image. If the composite score meets the image quality threshold, then the check processing module 108 can prepare the proper form of delivery for the check to the receiving institution 120 based on the receiving institution's 120 preferences.

As discussed previously, the image usability engine 118 can assess the usability of the electronic image to generate an image quality rating. In this case, the quality rating can be based on a confidence score produced by the image usability engine 118. The confidence score indicates the probability that the electronic image includes the necessary information to properly process the check. To develop a confidence score, the image usability engine 118 can examine different portions of the check to determine whether the proper information is present. For example, the image usability engine 118 can examine the currency amount portion of the check by using a recognition program to determine whether an amount is present and a probability that it recognized the correct amount. The probability can indicate the confidence that the required information is present and readable. The image usability engine 118 can analyze multiple portions of the check, such as the MICR code line, currency amount, signature, date, payee, endorsements, or any other portion in which information is required. The confidence score can be based on the probabilities of one or more portions. In exemplary embodiments, the confidence score can be based on the lowest probability out of all of the portions, or the confidence score can be based on a composite of two or more of the probabilities for different portions.

In an exemplary embodiment, the quality rating can be based entirely on the confidence score produced by the image usability analysis engine 118. Alternatively, the quality rating can comprise a composite score based on the confidence score produced by the image usability engine 118 and the image quality value produced by the IQA engine 116.

If the check processing module 112 determines that the image quality rating does not meet the image quality threshold associated with the electronic image's purpose in the threshold database 115, then the check processing module 112 rejects the image. In that case, the best fit clearing module 110 specially rejects the electronic image and sorts the electronic image and financial data for return to the sending institution 102 or an operator of the check processor 105 for correction, depending on which entity created the image.

In another alternative exemplary embodiment, the image quality rating can be based on the confidence score of the image usability engine without first assessing the image quality via the IQA engine 116.

The image quality assessment discussed above can be performed for the front side image, back side image, or both for each document.

Figure 2:
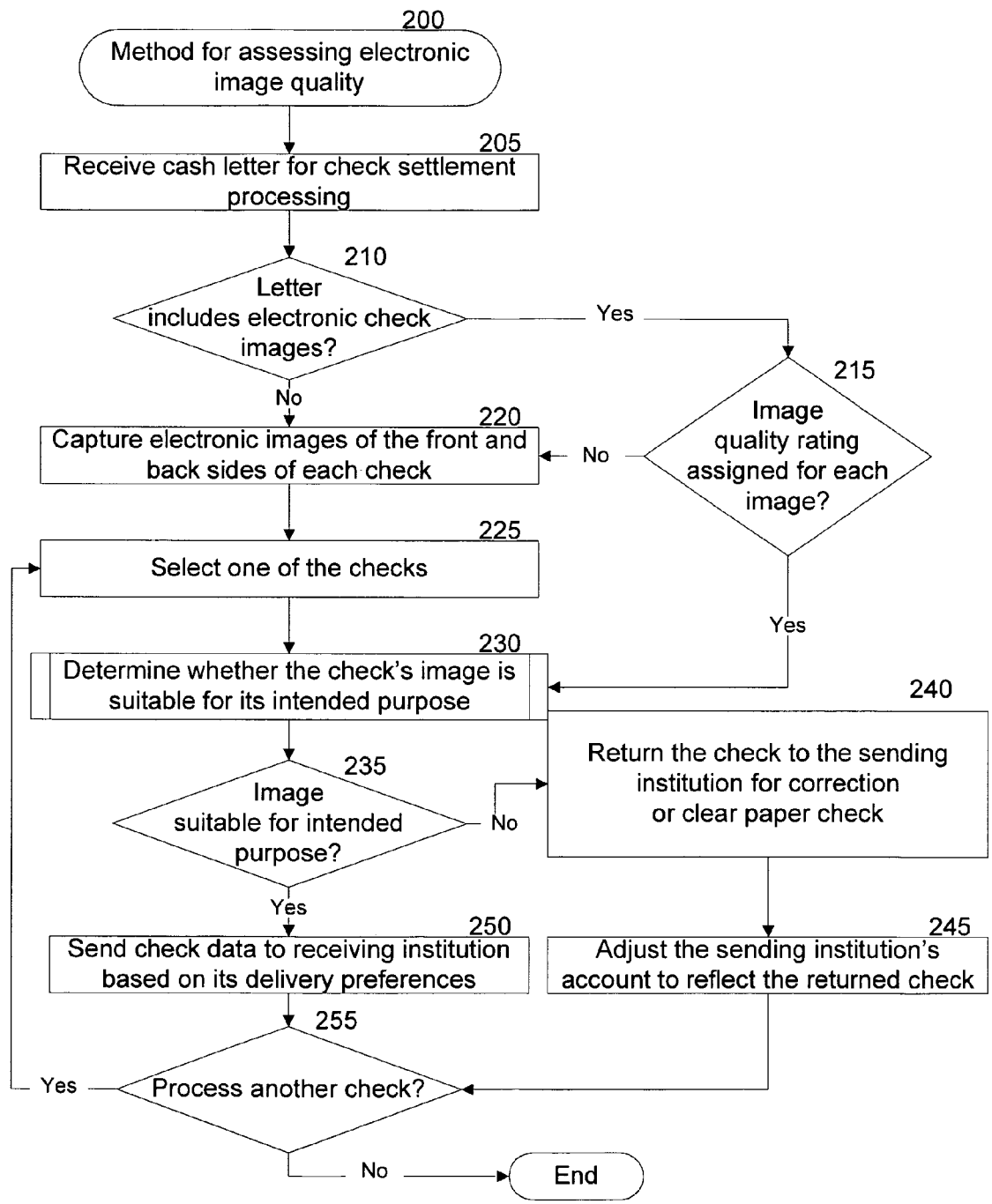
FIG. 2 is a flow chart illustrating a method for assessing electronic image quality according to an exemplary embodiment of the present invention.

FIG. 2 is a flow chart illustrating a method 200 for assessing electronic image quality according to an exemplary embodiment of the present invention. In step 205, the check processor 105 receives a cash letter from the sending institution 102 for check settlement processing. In step 210, the method 200 determines whether the cash letter included electronic check images. If the sending institution 102 forwarded an image cash letter to the check processor 105, then the cash letter included electronic check images. In that case, the method 200 branches to step 215. In step 215, the check processing module 108 determines whether an image quality rating is assigned for each image provided in the image cash letter. If not, then the method branches to step 220, which is discussed in more detail below. If the method 200 determines in step 215 that an image quality rating is assigned for each image, then the method branches to step 230, which is discussed in more detail below.

If the method 200 determines in step 210, that the cash letter did not include electronic images, then the method 200 branches to step 220. In an alternative exemplary embodiment, the method 200 can branch from step 210 to step 220 even if the cash letter included electronic check images. In this case, the check processor 105 may desire to capture its own images and/or assign its own image quality ratings for each check, rather than relying on the images and ratings provided by the sending institution 102.

In step 220, the MICR/image capturing device 106 captures electronic images of the front and back sides of each check. The MICR/image capturing device 106 also captures the financial data from the MICR code line on each check.

In step 225, the check processing module 108 selects one of the checks for image quality analysis. In step 230, the check processing module 108 determines whether the check's image is suitable for its intended purpose. Step 230 can be performed for the check's front side image, back side image, or both. Step 230 will be discussed in more detail below with reference to FIG. 3. The method 200 then proceeds to step 235.

Step 235 is a decision block indicating a determination of whether the image is suitable for its intended purpose. If not, then the method branches to step 240. In step 240, the check processing module 108 returns the check to the sending institution 102 or an operator of the check processor 105 for correction, depending on the entity that captured the image. In the alternative, a paper check is cleared. Then, in step 245, the check processing module 108 adjusts the sending institution's 102 account to reflect the returned check. The method then proceeds to step 255 to determine whether to process another check.

Referring back to step 235, if the check processing module 108 determines that the image is suitable for its intended purpose, then the method branches to step 250. In step 250, the check processing module 108 sends the check data to the receiving institution 120 based on the delivery preferences of the receiving institution 120. The method then proceeds to step 255 to determine whether to process another check. If the check processing module 108 will process another check, then the method branches back to step 225 to select another check. If it will not process another check, then the method ends.

Figure 3:
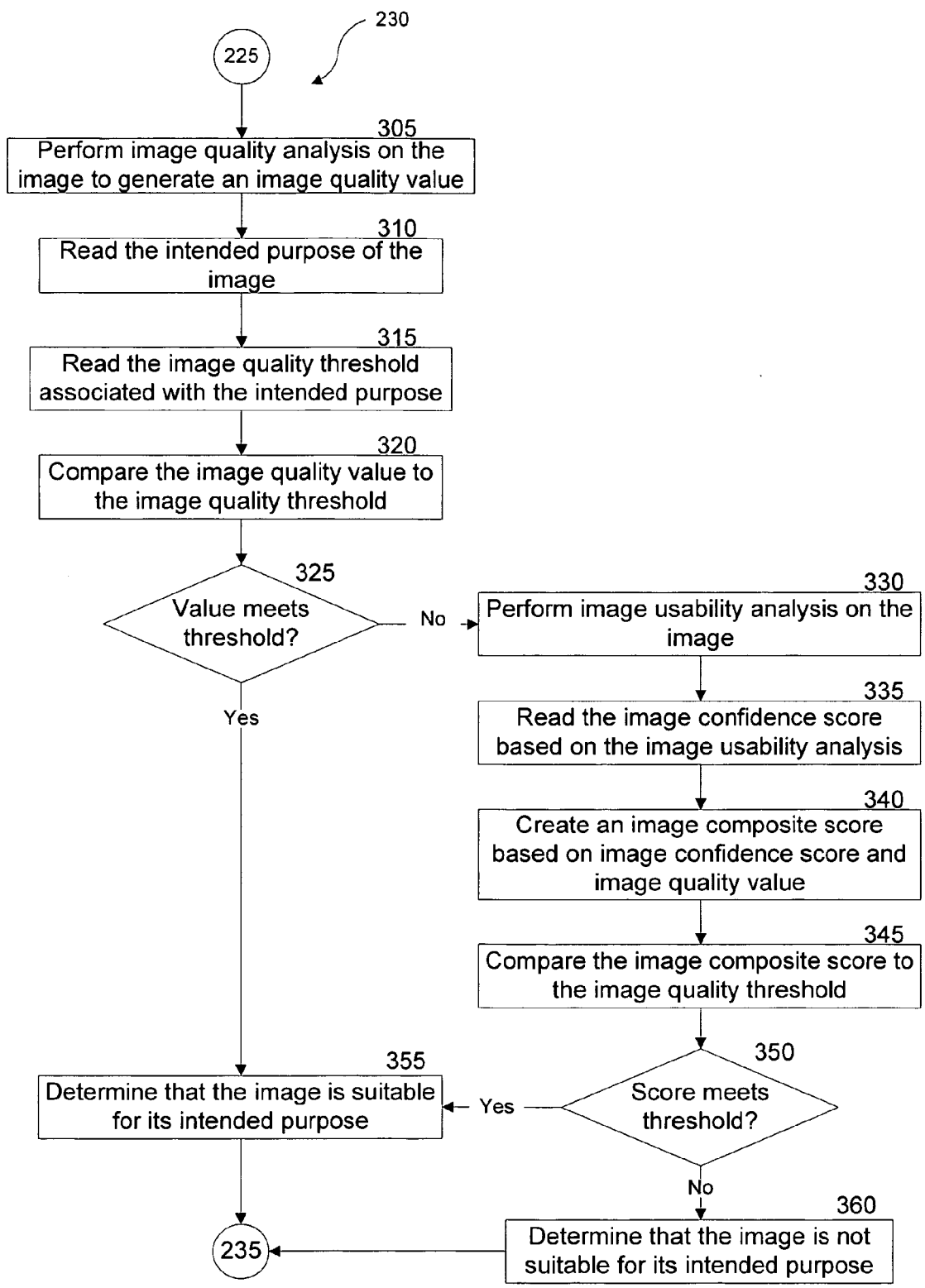
FIG. 3 is a flow chart illustrating a method for determining whether an electronic image is suitable for its intended purpose according to an exemplary embodiment of the present invention.

FIG. 3 is a flow chart illustrating a method 230 for determining whether a check image is suitable for its intended purpose according to an exemplary embodiment of the present invention, as referred to in step 230 of FIG. 2. In step 305, the IQA engine 116 performs image quality analysis on the selected image to generate an image quality value for the image. The check processing module 108 can read the image quality value associated with the check's image. In step 310, the check processing module 108 reads the intended use of the image. The intended use of the image is based on the receiving institution's 120 preferences for receiving checks for presentment. The receiving institution's 120 preferences are stored in the customer profile database 112. The preferences are also indicated by the clearing method identified by the best fit clearing module 110.

In step 315, the check processing module 108 reads the image quality threshold associated with the intended use from the threshold database 115. The image quality threshold can be established based on the intended purpose of the check. Accordingly, different check purposes can have different quality thresholds.

In step 320, the check processing module 108 compares the image quality value to the image quality threshold. Then, in step 325, the check processing module 108 determines whether the image quality value meets the image quality threshold. If yes, then the method branches to step 355, in which the check processing module 108 determines that the image is suitable for its intended purpose. The method then proceeds to step 235 (FIG. 2).

Referring back to step 325, if the check processing module 108 determines that the image quality value does not meet the image quality threshold, then the method branches to step 330. In step 330, the image usability analysis engine 118 performs an image usability analysis on the image. The image usability analysis engine 118 generates a confidence score that indicates a probability of the electronic image being suitable for its intended purpose. In step 335, the check processing module 108 reads the image confidence score created by the image usability analysis engine 118. Then, in step 340, the check processing module 108 creates an image composite score based on the image confidence score and the image quality value. In step 345, the check processing module 108 compares the image composite score to the image quality threshold to determine if the image is suitable for its intended purpose. In step 350, the check processing module 108 determines whether the composite score meets the image quality threshold. If yes, then the method branches to step 355 in which the check processing module 108 determines that the image is suitable for its intended purpose. The method then proceeds to step 235, FIG. 2.

If the check processing module 108 determines in step 350 that the image composite score does not meet the image quality threshold, then the method branches to step 360. In step 360, the check processing module 108 determines that the image is not suitable for its intended use. The method then proceeds to step 235 (FIG. 2).

In an alternative exemplary embodiment (not shown in FIG. 3), if the check processing module 108 determines in step 325 that the image quality value does not meet the image quality threshold, then the method can branch directly to step 360.

In another alternative exemplary embodiment (not shown in FIG. 3), step 340 can be omitted. In that case, in step 345, the check processing module 108 compares the image confidence score to the image quality threshold to determine whether the image is suitable for its intended purpose.

In yet another alternative exemplary embodiment (not shown in FIG. 3), steps 305, 320, 325, and 340 can be omitted. For this alternative embodiment of the method 230, the intended purpose of the image is read at step 310 and the image quality threshold associated with that intended purpose is read at step 315. In turn, an image usability analysis is performed on the image in step 330. An image confidence score is read in step 335, based on the image usability analysis. In step 345, this image confidence score is compared to the image quality threshold read in step 315. An inquiry is conducted in step 350 to determine whether the image confidence score meets or exceeds the image quality threshold. If so, the "YES" branch is followed from step 350 to step 355. In step 355, a determination is made that the image is suitable for its intended purpose. If, on the other hand, the inquiry of step 350 results in a negative response, the "NO" branch is followed from step 350 to step 360. In step 360, a determination is made that the image is not suitable for its intended purpose. From step 355 or step 360, the method proceeds to step 235, FIG. 2.

According to another exemplary embodiment, if the method 200 determines in step 215 of FIG. 2 that each image already has an assigned image quality rating, then the method 230 can use the image quality ratings supplied by the sending institution 102. In that case, if the supplied quality rating comprises an image quality value, then the method 245 can read the supplied quality rating in step 305 and use it as the image quality value. Additionally, if the supplied quality rating comprises an image confidence score, then the method 245 can read the supplied quality rating in step 335 and use it as the image confidence score.

As discussed above, the exemplary embodiments can assess the quality of an electronic image to determine whether the image is suitable for its intended purpose. Multiple purposes can have different quality thresholds based on the desired image quality for further processing of the electronic image. The image's quality can be compared to the threshold associated with the image's purpose. The image is suitable for its intended purpose if its quality meets the threshold.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method for assessing the quality of an electronic image, comprising the steps of:
assigning on a computer an image quality value to the electronic image;
selecting a purpose for the electronic image from a plurality of potential purposes comprising at least one of an image cash letter, a substitute check, and an electronic cash letter, each of the potential purposes being associated with a respective one of a plurality of image quality thresholds;
identifying the respective image quality threshold associated with the selected purpose of the electronic image; and
determining whether the image quality value of the electronic image meets or exceeds the respective image quality threshold associated with the selected purpose for the electronic image,
wherein the electronic image is suitable for the selected purpose if the image quality value of the electronic image meets or exceeds the respective image quality threshold.

2. The computer-implemented method according to claim 1, further comprising the step of associating the plurality of image quality thresholds with the respective ones of the plurality of potential purposes,
wherein said identifying step comprises the step of reading the image quality threshold associated with the selected purpose for the electronic image.

3. The computer-implemented method according to claim 1, further comprising the step of capturing the electronic image from a paper document.

4. The computer-implemented method according to claim 3, wherein the paper document comprises a check.

5. The computer-implemented method according to claim 1, wherein said selecting step comprises the steps of:
reading a customer's preferences for receiving information regarding the electronic image; and
selecting the purpose for the electronic image based on the customer's preferences.

6. The computer-implemented method according to claim 1, wherein said step of assigning an image quality value comprises the steps of:
processing the electronic image by an image quality analysis engine; and determining the image quality value based on a result of said processing step.

7. The computer-implemented method according to claim 6, wherein said step of determining the image quality value comprises the steps of:
measuring a value for each of a plurality of metrics, each metric indicating a respective quality trait of the electronic image;
identifying a lowest value measured for the metrics; and
basing the image quality value on the lowest value.

8. The computer-implemented method according to claim 6, wherein said step of determining the image quality value comprises the steps of:
measuring a value for each of a plurality of metrics, each metric indicating a respective quality trait of the electronic image; and
basing the image quality value on a composite of the respective values measured for the metrics.

9. The computer-implemented method according to claim 1, further comprising the step of rejecting the electronic image based on a determination that the image quality value does not meet the respective image quality threshold associated with the selected purpose for the electronic image.

10. The computer-implemented method according to claim 9, further comprising the steps of:
determining a usability of the electronic image in response to the image being rejected in said rejecting step; and
determining whether to accept the electronic image based on the usability of the electronic image.

11. The computer-implemented method according to claim 10, wherein said step of determining a usability of the electronic image comprises the steps of:
processing the electronic image by an image usability analysis engine; and
determining an image confidence score based on a result of said processing step.

12. The computer-implemented method according to claim 11, wherein said step of determining whether to accept the electronic image based on the usability of the electronic image comprises the steps of:
determining whether the image confidence score meets or exceeds respective the image quality threshold associated with the selected purpose for the electronic image: and
accepting the electronic image based on a determination that the image confidence score meets or exceeds the respective image quality threshold associated with the selected purpose for the electronic image.

13. The computer-implemented method according to claim 10, wherein said step of determining a usability of the electronic image comprises the steps of:
processing the electronic image by an image usability analysis engine;
determining an image confidence score based on a result of said processing step; and
determining a composite score based on the image quality value and the image confidence score.

14. The computer-implemented method according to claim 13, wherein said step of determining whether to accept the electronic image based on the usability of the electronic image comprises the steps of:
determining whether the composite score meets or exceeds the respective image quality threshold associated with the selected purpose for the electronic image; and
accepting the electronic image based on a determination that the composite score meets or exceeds the respective image quality threshold associated with the selected purpose for the electronic image.

15. A computer-readable medium having computer-executable instructions for performing the computer-implemented method of claim 1.

16. A computer-implemented method for assessing the quality of an electronic image comprising the steps of:
determining on a computer a quality rating for the electronic image;
selecting a purpose for the electronic image from a plurality of potential purposes comprising at least one of an image cash letter, a substitute check, and an electronic cash letter, each of the potential purposes being associated with a respective one of a plurality of image quality thresholds;
identifying the respective image quality threshold associated with the selected purpose of the electronic image; and
determining whether the quality rating of the electronic image meets or exceeds the respective image quality threshold associated with the selected purpose for the electronic image,
wherein the electronic image is suitable for its intended purpose if the quality rating of, the electronic image meets or exceeds the respective image quality threshold.

17. The computer-implemented method according to claim 16, wherein the quality rating comprises an image quality value produced by an image quality analysis engine.

18. The computer-implemented method according to claim 17 wherein the image quality value comprises a lowest value measured for one of a plurality of metrics, each metric indicating a respective quality trait of the electronic image.

19. The computer-implemented method according to claim 17, wherein the image quality value comprises a composite of a plurality of values measured for a corresponding plurality of metrics, each metric indicating a respective quality trait of the electronic image.

20. The computer-implemented method according to claim 16, wherein the quality rating comprises an image confidence score produced by an image usability analysis engine.

21. The computer-implemented method according to claim 16, wherein the quality rating comprises a composite score based on an image quality value produced by an image quality analysis engine and an image confidence score produced by an image usability analysis engine.

22. The computer-implemented method according to claim 16, further comprising the step of associating a each of the plurality of image quality thresholds with the respective ones of the plurality of potential purposes for electronic images,
wherein the potential purposes comprise the selected purpose for the electronic image, and
wherein said identifying step comprises the step of reading the respective image quality threshold associated with the selected purpose for the electronic image.

23. The computer-implemented method according to claim 16, further comprising the step of rejecting the electronic image based on a determination that the quality rating does not meet the respective image quality threshold associated with the selected purpose for the electronic image.

24. The computer-implemented method according to claim 16, further comprising the step of capturing the electronic image from a paper document.

25. The computer-implemented method according to claim 24, wherein the paper document comprises a check.

26. The computer-implemented method according to claim 16, wherein said step of selecting a purpose of the electronic image comprises the steps of:
reading a customer's preferences for receiving information regarding the electronic image; and
determining the selected purpose of the electronic image based on the customer's preferences.

27. A computer-readable medium having computer-executable instructions for performing the computer-implemented method of claim 16.

28. A computer-implemented method for assessing the quality of an electronic image comprising the steps of:
determining on a computer a quality rating for the electronic image;
associating a plurality of different image quality thresholds with respective ones of a plurality of different purposes for electronic images, the plurality of purposes comprising at least one of an image cash letter, a substitute check, and an electronic cash letter;
selecting one of the purposes for the electronic image;
identifying an image quality threshold associated with the selected purpose for the electronic image; and
determining whether the quality rating meets or exceeds the image quality threshold,
wherein the electronic image is suitable for its intended purpose if the quality rating meets or exceeds the image quality threshold.

29. The computer-implemented method according to claim 28, further comprising the step of rejecting the electronic image based on a determination that the quality rating does not meet the image quality threshold.

30. The computer-implemented method according to claim 28, wherein the quality rating comprises an image quality value produced by an image quality analysis engine.

31. The computer-implemented method according to claim 30, wherein the image quality value comprises a lowest value measured for one of a plurality of metrics, each metric indicating a respective quality trait of the electronic image.

32. The computer-implemented method according to claim 30, wherein the image quality value comprises a composite of a plurality of values measured for a corresponding plurality of metrics, each metric indicating a respective quality trait of the electronic image.

33. The computer-implemented method according to claim 28, wherein the quality rating comprises an image confidence score produced by an image usability analysis engine.

34. The computer-implemented method according to claim 28, wherein the quality rating comprises a composite score based on an image quality value produced by an image quality analysis engine and an image confidence score produced by an image usability analysis engine.

35. The computer-implemented method according to claim 28, further comprising the step of capturing the electronic image from a paper document.

36. The computer-implemented method according to claim 35, wherein the paper document comprises a check.

37. The computer-implemented method according to claim 28, wherein said step of selecting one of the purposes for the electronic image comprises the steps of:
reading a customer's preferences for receiving information regarding the electronic image; and
selecting a purpose that corresponds to the customer's preferences.

38. A computer-readable medium having computer-executable instructions for performing the computer-implemented method of claim 28.

39. A computer-implemented method for assessing the quality of an electronic image, comprising the steps of:
assigning on a computer an image quality value to the electronic image;
reading a customer's preferences for receiving information regarding the electronic image;
selecting a purpose for the electronic image from a plurality of potential purposes based on the customer's preferences;
identifying an image quality threshold based on the selected purpose of the electronic image; and
determining whether the image quality value meets or exceeds the image quality Threshold,
wherein the electronic image is suitable for the selected purpose if the image quality value meets or exceeds the image quality Threshold.

40. The method of claim 39, wherein the selected purpose comprises one of an image cash letter, a substitute check, and an electronic cash letter.

41. The method of claim 39, further comprising the step of associating a plurality of image quality thresholds with respective ones of the plurality of potential purposes,
wherein said identifying step comprises the step of reading the image quality threshold associated with the selected purpose for the electronic image.

42. The method of claim 39, further comprising the step of capturing the electronic image from a paper check.

43. The method of claim 39, wherein said step of assigning an image quality value comprises the steps of:
processing the electronic image by an image quality analysis engine; and
determining the image quality value based on a result of said processing step.

* * * * *

UNITED STATES PATENT AND TRADEMARK OFFICE
CERTIFICATE OF CORRECTION

PATENT NO. : 7,283,656 B2  Page 1 of 1
APPLICATION NO. : 11/079120
DATED : October 16, 2007
INVENTOR(S) : James A. Blake et al.

It is certified that error appears in the above-identified patent and that said Letters Patent is hereby corrected as shown below:

Claim 12, Column 13, line 43, "respective the" should read --the respective--;

Claim 22, Column 14, line 51, "associating a each" should read --associating each--;

Claim 28, Column 15, line 14, "image comprising" should read --image, comprising--;

Claim 39, Column 16, line 30, "Threshold" should read --threshold--; and

Claim 39, Column 16, line 33, "Threshold" should read --threshold--.

Signed and Sealed this

Eighteenth Day of March, 2008

JON W. DUDAS
*Director of the United States Patent and Trademark Office*